United States Patent
Morton et al.

[11] Patent Number: 5,999,318
[45] Date of Patent: Dec. 7, 1999

[54] REFLECTIVE OVERCOAT FOR REPLICATED DIFFRACTION GRATINGS

[75] Inventors: Richard G. Morton, San Diego, Calif.; Thomas C. Blasiak, Rochester, N.Y.

[73] Assignees: Cymer, Inc., San Diego, Calif.; Spectronic Instruments, Inc., Rochester, N.Y.

[21] Appl. No.: 09/265,288

[22] Filed: Mar. 9, 1999

Related U.S. Application Data

[63] Continuation of application No. 08/785,628, Jan. 17, 1997, abandoned.

[51] Int. Cl.⁶ .............................. G02B 5/18; G02B 5/06
[52] U.S. Cl. ......................... 359/572; 359/576; 427/162
[58] Field of Search .................... 359/572, 566, 359/576, 900; 427/162, 166; 264/1.1, 1.3

[56] References Cited

U.S. PATENT DOCUMENTS

| | | | |
|---|---|---|---|
| 2,464,738 | 3/1949 | White et al. | 18/59 |
| 3,875,026 | 4/1975 | Widmer | 204/27 |
| 3,942,873 | 3/1976 | Shimotakahara | 359/572 |
| 4,657,780 | 4/1987 | Pettigrew et al. | 427/54.1 |
| 4,928,132 | 5/1990 | Pettigrew et al. | 346/135.1 |
| 5,020,879 | 6/1991 | Kuzuta et al. | 350/162.17 |
| 5,042,887 | 8/1991 | Yamada | 359/360 |
| 5,080,465 | 1/1992 | Laude | 359/571 |
| 5,310,220 | 5/1994 | Föhl | 280/806 |
| 5,377,044 | 12/1994 | Tomono et al. | 359/566 |
| 5,384,571 | 1/1995 | Myers et al. | 342/4 |
| 5,436,764 | 7/1995 | Umetani et al. | 359/566 |
| 5,457,573 | 10/1995 | Iida et al. | 359/569 |
| 5,493,393 | 2/1996 | Beranek et al. | 356/328 |

FOREIGN PATENT DOCUMENTS

| | | |
|---|---|---|
| 48-28336 | 4/1973 | Japan . |
| 7-140310 | 6/1995 | Japan . |

OTHER PUBLICATIONS

Georg Hass et al., "Reflecting Coatings for the Extreme Ultraviolet," Journal of the Optical Society of America, vol. 49, No. 6, Jun. 1959, pp. 593–602.

L. R. Canfield et al., "Further Studies on MgF$_2$–Overcoated Aluminum Mirrors with Highest Reflectance in the Vacuum Ultraviolet," Jan. 1966, vol. 5, No. 1, Applied Optics, pp. 45–50.

Robert P. Madden, "Preparation and Measurement of Reflecting Coatings for the Vacuum Ultraviolet," vol. 1, Physics of Thin Films—Advances in Research and Development, edited by Georg. Hass, Academic Press, New York and London, 1963.

Primary Examiner—Jon Henry
Attorney, Agent, or Firm—Brian D. Ogonowsky

[57] ABSTRACT

An extra step for a conventional replica forming process for diffraction gratings used in lasers is described herein. Applicant has discovered that the deterioration of a replica diffraction grating, when used with intense laser light, is accelerated due to small quantities of the radiation leaking through minute fractures in the aluminum reflective coating. Applicant has identified the source of this problem as occurring during the removal of the replica from the master grating. Applicant's improvement to this conventional process is to deposit a thin reflective overcoat of aluminum on the surface of the replica after the replica has been removed from the master and cleaned. The overcoating is performed in a vacuum chamber by sputtering or evaporation. This overcoat is not subjected to any subsequent destructive forces and hence remains relatively opaque. A typical thickness of the overcoat is around 100 nm. An oxide layer is formed over the aluminum and a third layer of aluminum is formed over the oxide.

8 Claims, 2 Drawing Sheets

REFLECTIVE OVERCOAT FOR REPLICATED DIFFRACTION GRATINGS

CROSS-REFERENCE TO RELATED APPLICATIONS

This is a continuation of U.S. application Ser. No. 08/785,628, filed Jan. 17, 1997, now abandoned having the same title as the present application.

FIELD OF THE INVENTION

This invention relates to diffraction gratings and, in particular, to a technique used for extending the life of a diffraction grating.

BACKGROUND

Diffraction gratings are frequently used in lasers for reflecting back into a laser's resonating cavity only a narrow range of wavelengths of light centered at one particular wavelength. Light energy at this wavelength resonates within the cavity and is emitted through a partially reflective mirror at the other end of the cavity. Examples of such diffraction gratings and various methods of making these diffraction gratings are described in U.S. Pat. Nos. 5,080,465; 5,436,764; and 5,493,393, incorporated herein by reference.

Typically, a master diffraction grating is first manufactured. This master grating is then used to form many replica gratings. Each of these replica gratings may then be used as a master grating for forming other replica gratings. Accordingly, compared to the master, the replicas may be made inexpensively.

As described in the '465 patent, a master grating may be formed by depositing aluminum over a substrate, such as glass. A diamond tool under interferometric control may then be used to etch very closely spaced grooves in the aluminum layer. The separation of the grooves is related to the wavelength of the light to be reflected by the grating and to the narrowness of the range of wavelengths it is required to reflect. In one embodiment, the diamond tool etches on the order of tens of thousands of grooves per inch. The diffraction grating may be ten inches square and one inch thick. Creating a precision master grating by physical etching is, therefore, an extremely time consuming and expensive process.

Once a master grating has been made, replicas of the grating are made in the following process. A release agent, such as described in the '764 patent, is coated on the surface of the master. This is preferably done in a vacuum chamber. A thin (e.g., 1 micron) reflective layer, such as aluminum, is then sputtered or evaporated onto the release layer. The master grating is then removed from the vacuum chamber. Liquid epoxy, such as described in the '465 patent, is then deposited on the aluminum layer, and a glass substrate is then placed on top of the epoxy. After the epoxy is cured, the glass layer, epoxy layer, and aluminum layer are then lifted from the master grating, resulting in a replica of the master grating.

Applicant has discovered that, when the replica is removed from the master grating, imperceptible damage is done to the thin layer of aluminum on the replica.

When the replicated diffraction grating is used as a selective wavelength reflector for generating a laser light beam, the replicated grating is subjected to intense light energy. Changes in the groove shape occur when the grating is exposed to intense light for long periods of time. This causes a loss of reflectance in the desired diffraction order, where some of the optical energy is shifted to other diffraction orders due to large scale groove angle changes, and some of the energy is lost to scatter due to small scale surface distortions of the groove faces.

Up until now, it was believed that the lifetime of such replicas could not be extended.

Applicant has discovered that the aluminum coating deposited during the replication process, typically about 1 micron thick, is subjected to forces during the subsequent take-apart step of the replication process which tend to generate very small fractures in the aluminum coating. These fractures allow small quantities of ultraviolet radiation to leak through to the underlying epoxy when the grating is put into service in an excimer laser. The ultraviolet light which reaches the epoxy causes photodecomposition of the epoxy, releasing gases which cause blisters in the overlying aluminum coating. This blistering greatly increases scatter losses from the reflecting facets of the grating. The ultraviolet light also causes bulk shrinkage of the epoxy, which distorts the original groove shape, causing a loss of reflectivity in the desired diffraction order. These effects severely limit the useful lifetime of the grating, causing unavailability of the equipment in which it is used at relatively frequent intervals.

What is needed is an improved replication process which lengthens the life of the replica gratings.

SUMMARY

An extra step for the conventional replica forming process for diffraction gratings used in lasers is described herein which overcomes the problems previously described.

Applicant's improvement to this conventional process is to deposit a thin reflective overcoat of aluminum on the surface of the replica after the replica has been removed from the master and cleaned. The overcoating is performed in a vacuum chamber by sputtering or evaporation. This overcoat is not subjected to any subsequent destructive forces and hence remains relatively opaque. A typical thickness of the overcoat is around 100 nm.

DETAILED DESCRIPTION OF THE PREFERRED EMBODIMENTS

Figure 1:
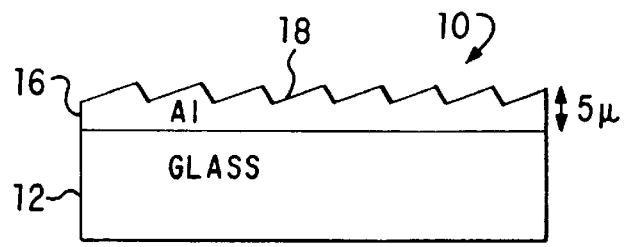
FIGS. 1–6 show a cross-section of a master grating and the subsequent steps used to form a conventional replica from the master grating.
Figure 2:
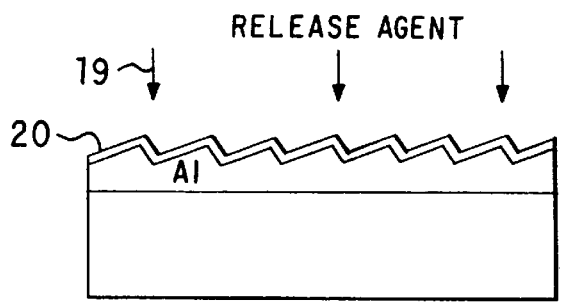

FIG. 1 is a cross-section of a master diffraction grating 10 which has been created using conventional processes. In one embodiment, master grating 10 is one inch thick and consists of a glass substrate 12 and an etched aluminum layer 16. Layer 16 is typically around 5 microns thick and mechanically etched to form grooves 18 using a diamond stylus, as described in the previously mentioned prior art patents. The features of the grooves 18 in the aluminum layer 16 are greatly exaggerated since there may be greater than 10,000 grooves per inch etched in the aluminum layer 16. In one embodiment, grooves 18 are spaced 12 microns apart. The master grating 10 may be formed by other processes and may even be a replica of a master.

FIGS. 2–6 illustrate the conventional steps used to form a replica of this master grating 10.

The master grating 10 is placed in a vacuum chamber similar to those used for wafer fabrication. A release agent 19, such as silicone oil or any other known release agent, is then deposited on the aluminum layer 16 to form a release layer 20. This release layer 20 is preferably extremely thin, such as on the order of a few molecules deep (e.g., 1–2 nm). The thickness of the release layer 20 may be determined by well known optical methods used in conventional wafer fabrication process.

Figure 3:
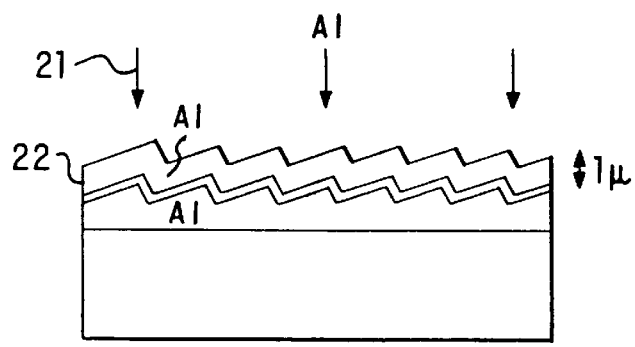

In FIG. 3, aluminum 21 is then evaporated or sputtered onto the release layer 20 to form an aluminum layer 22 about 1 micron thick. The master grating 10 is then removed from the vacuum chamber.

Figure 4:
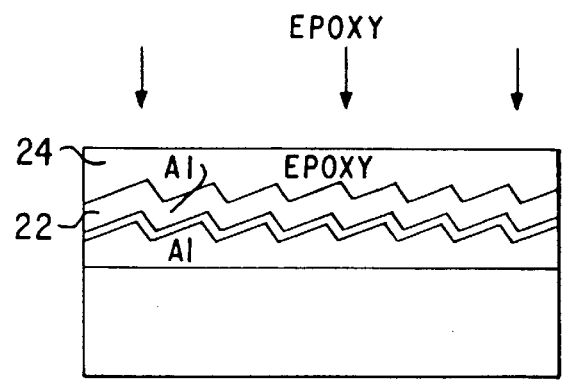

In FIG. 4, a layer of liquid epoxy 24 is then deposited over the aluminum layer 22. Epoxy layer 24 may be virtually any thickness (e.g., 15 microns).

Figure 5:
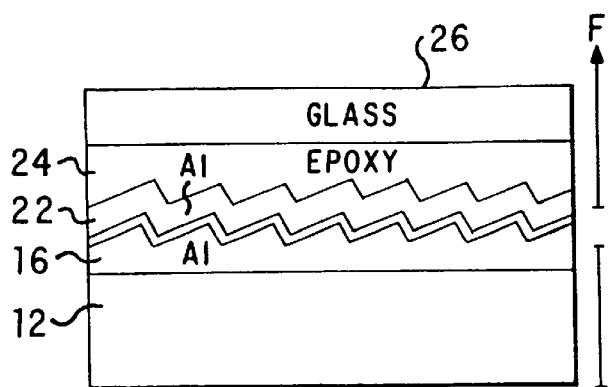

As shown in FIG. 5, a glass substrate 26, used for additional mechanical support if necessary, is then positioned over the epoxy 24. The epoxy 24 is then cured such as by heat or other methods until hardened. In another embodiment, epoxy-coated glass is placed over aluminum layer 22.

After the epoxy has hardened, the glass substrate 26 is removed vertically from the master grating 10 to separate the replica from the master grating 10.

Figure 6:
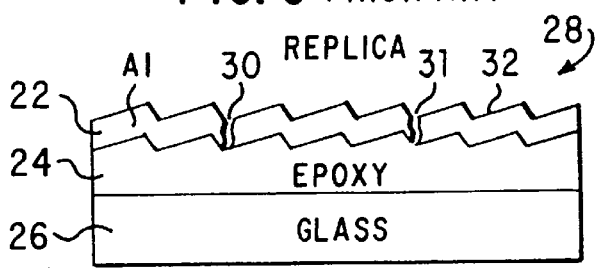

The resulting replica 28 is shown in FIG. 6. As previously mentioned, the removal step in FIG. 5 frequently causes imperceptible cracking of the aluminum layer 22 as illustrated by cracks 30 and 31. These cracks were not previously discovered to Applicant's knowledge, and the effects of these cracks on the life of a replica were not appreciated. As previously described, these cracks allow some portion of the ultraviolet energy from a laser to impinge upon the underlying epoxy 24. Over time, this disintegrates and shrinks the epoxy and causes distortion of the overlying aluminum layer 22. Applicant's analysis of this effect has shown that the effective groove geometry changes and blisters occur on the grating's reflecting facets 32 as a result of this disintegration of the epoxy after a large number of laser pulses. The blistering manifests itself as a hazy region on the grating surface which is visible to the naked eye. This haziness reduces the efficiency of the grating, causing less light to be reflected into the desired diffraction order.

Figure 7:
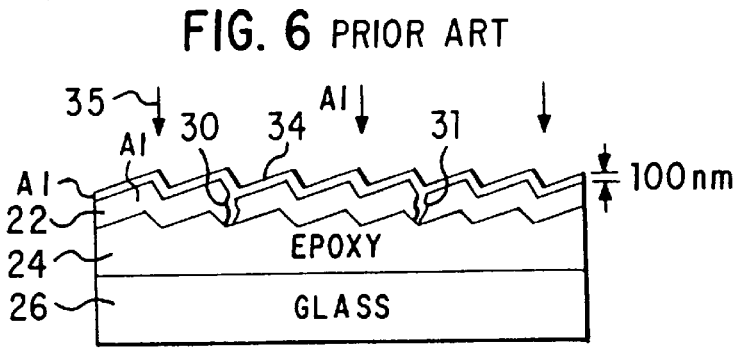
FIG. 7 illustrates the subsequent step of forming a thin reflective overcoat on the replica to protect the underlying epoxy from radiation passing through cracks in the original aluminum layer.

Applicant's additional step is illustrated in FIG. 7. A thin layer 34 of aluminum 35 sputtered or evaporated onto the surface of the prior aluminum layer 22 in a vacuum chamber. This thin aluminum layer 34 need only be on the order of 100 nm to prevent any subsequent deterioration of the epoxy layer 24 due to the cracks 30 and 31 in the underlying aluminum layer 22.

Accordingly, the fractures in the original aluminum layer 22 are now covered or filled in. This prevents ultraviolet light from affecting the underlying epoxy 24. Since the thin aluminum layer 34 overcoat is applied after the replication process is complete, it is not subjected to any subsequent destructive forces, and hence remains relatively opaque. Other thicknesses of the aluminum layer 34 (e.g., up to 1 micron) may be used; however, a thin aluminum layer is desirable to maintain the original characteristics of the facets in the replica grating shown in FIG. 6.

Figure 8:
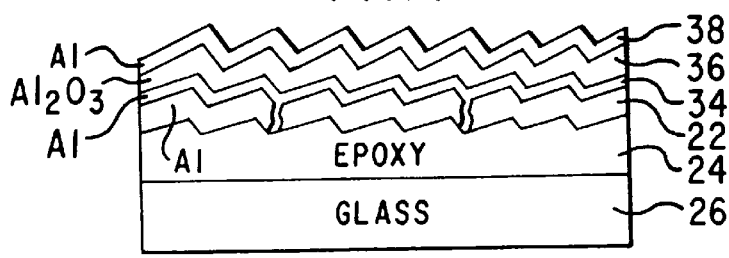
FIG. 8 illustrates an alternative embodiment overcoat incorporating a plurality of layers to increase opacity.

The aluminum overcoat may be applied in two or more layers, with oxide layers in between, to increase the resulting overcoat opacity as needed. This is illustrated in FIG. 8, where an additional oxide layer 36 and an additional aluminum layer 38 are shown.

Figure 9:
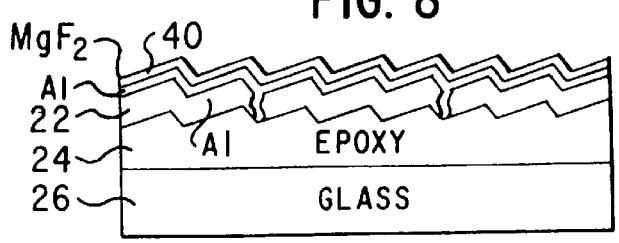
FIG. 9 illustrates an alternative embodiment using an $MgF_2$ layer over the aluminum overcoat to prevent oxidation damage.

FIG. 9 illustrates another embodiment, where a thin layer 40 of $MgF_2$ is deposited, using conventional techniques, over the aluminum layer 34 of FIG. 7 to prevent oxidation damage to the aluminum layer 34.

Applicant has performed extensive tests on replica diffraction gratings using the above-described process and has confirmed that the lifetime of diffraction gratings with the aluminum overcoat is extended far beyond that of untreated gratings. The reflectance of the overcoated grating over its lifetime varies much more slowly than that of untreated gratings. The replacement interval and associated operating costs of the laser system are greatly reduced.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A process for forming a replica of a diffraction grating, said replica for reflecting ultraviolet light, said process comprising:

providing a master diffraction grating;

depositing a release layer over a top surface of said master diffraction grating;

depositing a first aluminum layer over said release layer;

providing an adhesive layer and a substrate over said first aluminum layer;

removing said adhesive layer, said substrate, and said first aluminum layer from said master diffraction grating;

depositing a second aluminum layer over said first aluminum layer;

allowing a layer of oxide to form over said second aluminum layer by introducing an amount of oxygen into a vacuum coating chamber containing said substrate with said adhesive layer and said first aluminum layer thereon; and depositing a third aluminum layer over said oxide.

2. The method of claim 1 wherein said adhesive layer is an epoxy layer.

3. The method of claim 1 wherein said step of depositing said second aluminum layer comprises sputtering aluminum onto a surface of said first aluminum layer.

4. The method of claim 1 wherein said step of depositing said second aluminum layer comprises evaporating aluminum onto a surface of said first aluminum layer.

5. The method of claim 1 wherein said first aluminum layer incorporates one or more openings which would allow ultraviolet radiation to leak through said first aluminum layer onto said adhesive layer had said second aluminum layer and said third aluminum layer not been deposited over said first aluminum layer.

6. A replica diffraction grating removed from a master diffraction grating comprising:

an adhesive layer;

a first aluminum layer secured to a surface of said adhesive layer, said first aluminum layer having facets formed therein corresponding to facets in said master diffraction grating, said facets reflecting light of an ultraviolet wavelength;

a second aluminum layer deposited over said first aluminum layer after said first aluminum layer and said adhesive layer have been removed from said master diffraction grating;

an oxide layer over said second aluminum layer; and a third aluminum layer deposited over said oxide layer.

7. The structure of claim 6 wherein said second aluminum layer has a thickness greater than approximately 100 nanometers.

8. The structure of claim 6 wherein said first aluminum layer incorporates one or more openings which would allow ultraviolet radiation to leak through said first aluminum layer into said adhesive layer had said second aluminum layer and said third aluminum layer not been deposited over said first aluminum layer.

\* \* \* \* \*